United States Patent [19]

Hickey, Jr.

[11] 3,930,804
[45] Jan. 6, 1976

[54] DEEP SEA GAS GENERATOR CONTAINER

[75] Inventor: George F. Hickey, Jr., Oxon Hill, Md.

[73] Assignee: The United States of America as represented by the Secretary of the Navy, Washington, D.C.

[22] Filed: Nov. 4, 1974

[21] Appl. No.: 520,769

[52] U.S. Cl............................ 23/282; 9/8 R; 60/219
[51] Int. Cl.²..... B01J 7/02; C06D 5/10; F23R 1/14
[58] Field of Search ......... 23/282; 9/8 R, 9; 60/205, 60/219; 102/39 R, 43 P

[56] References Cited
UNITED STATES PATENTS

| | | | |
|---|---|---|---|
| 2,918,003 | 12/1959 | Temple | 102/39 X |
| 3,352,238 | 11/1967 | Spragg et al. | 102/39 |
| 3,372,996 | 3/1968 | Barrett et al. | 23/282 |

Primary Examiner—Morris O. Wolk
Assistant Examiner—Barry I. Hollander
Attorney, Agent, or Firm—R. S. Sciascia; Arthur L. Branning; M. L. Crane

[57] ABSTRACT

A device for generating gas at a constant rate for raising a water profiler during measurement of different parameters of the sea. The device is of a specific construction including a housing with end caps. LiH is placed into the housing and capped. A blasting cap ruptures one end cap permitting water to enter the housing. The water mixed with the LiH generates hydrogen gas and LiOH which provides lift for a profiler. A plurality of the gas generators are assembled onto a profiler for causing the profiler to ascend as many times as the number of devices carried by the profiler.

5 Claims, 3 Drawing Figures

DEEP SEA GAS GENERATOR CONTAINER

CROSS REFERENCE TO RELATED CASE

This invention relates to a copending patent application identified as Navy Case No. 58,594 Ser. No. 520,818, filed on the same day, Nov. 4, 1974.

BACKGROUND OF THE INVENTION

This invention relates to gas generation devices and more particularly to a hydrogen gas generator useful in lifting underwater measuring instrumentation.

Heretofore instrumentation useful for detecting underwater phenomena has been lowered into the water by use of weights on a housing, which housing has a positive buoyance when floated to the surface by dropping the weights. Other instrumentation has been secured to a buoy and lowered into the water suspended from a buoy. Other instrumentation has been secured within a buoy and phenomena near the surface has been measured. Such devices require periodic or constant care and usually measures the phenomena at only one depth within the water. Other systems require an attending ship with cables extending therefrom with sensors attached to the cable.

SUMMARY OF THE INVENTION

This invention is directed to a hydrogen gas generator useful with underwater research instrumentation which upon activation raises the instrumentation from the depths to a point on or beneath the surface so that measurements may be made along the path of travel.

It has become of great importance to underwater research personnel to obtain a profile of the water depths at various locations throughout the oceans and other waters. Amplitude, phase and frequency fluctuations of acoustic signals as well as other measurements in the ocean environment severely restrict applications of underwater acoustics as well as other undertakings for different purposes. Therefore, it has become important to determine the acoustical properties and other phenomena at different depths and in different areas of the waters. The hydrogen gas generator is designed to move a detector assembly upwardly along a fixed cable and then permit the assembly to descend to the bottom and a second, hydrogen generator raises the assembly all on programmed command. This is repeated for as many times as there are hydrogen gas generators assembled within the assembly, and over a period of time programmed into the system. The system may be dropped and left unattended for long periods of time. After the programmed time period has elapsed, the assembly is acoustically released from its anchor, collected and the recorded history of the up and down measurements of the sea parameters may be analysed. As can be seen, different measuring systems may be placed anywhere within the oceans, seas, etc., for measuring profiles of the water along a specific depth.

The hydrogen gas generator-system has been set forth in an article "Hydrogen Gas Generator for Deep Sea Sensor" by W. H. Barber et al., AIAA paper No. 73-1202. AIAA/SAE 9th Propulsion Conference, Las Vegas, Nev., Nov. 5-7, 1973 by American Institute of Aeronautics and Astronautics 750 3rd Avenue, New York N.Y. 10017.

BRIEF DESCRIPTION OF THE DRAWINGS

FIG. 3 illustrates a buoy-anchor system for positioning the system in the water in which a sea parameter profile is desired.

DETAILED DESCRIPTION

Figure 1:
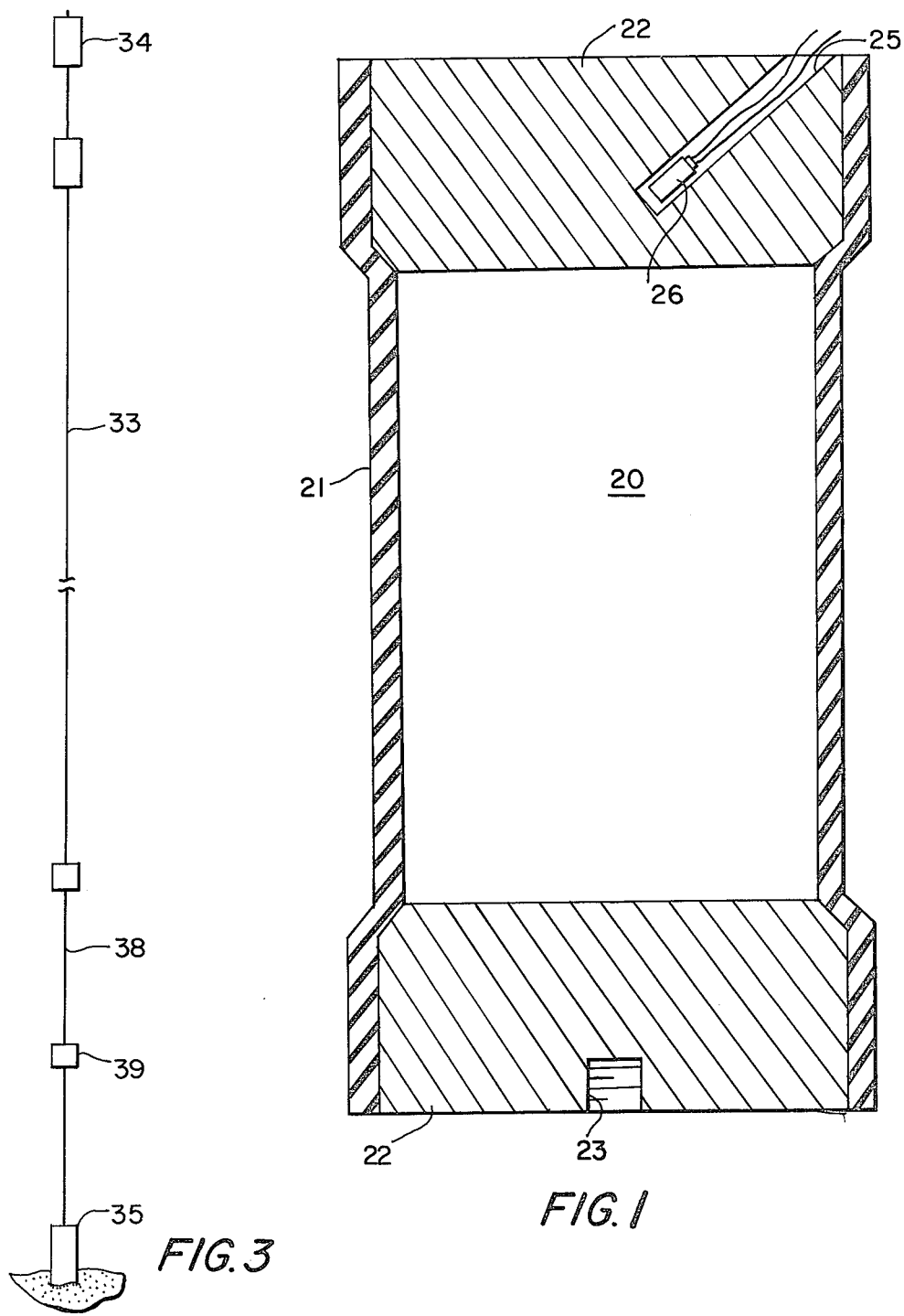
FIG. 1 illustrates a single hydrogen generator.
Figure 2:
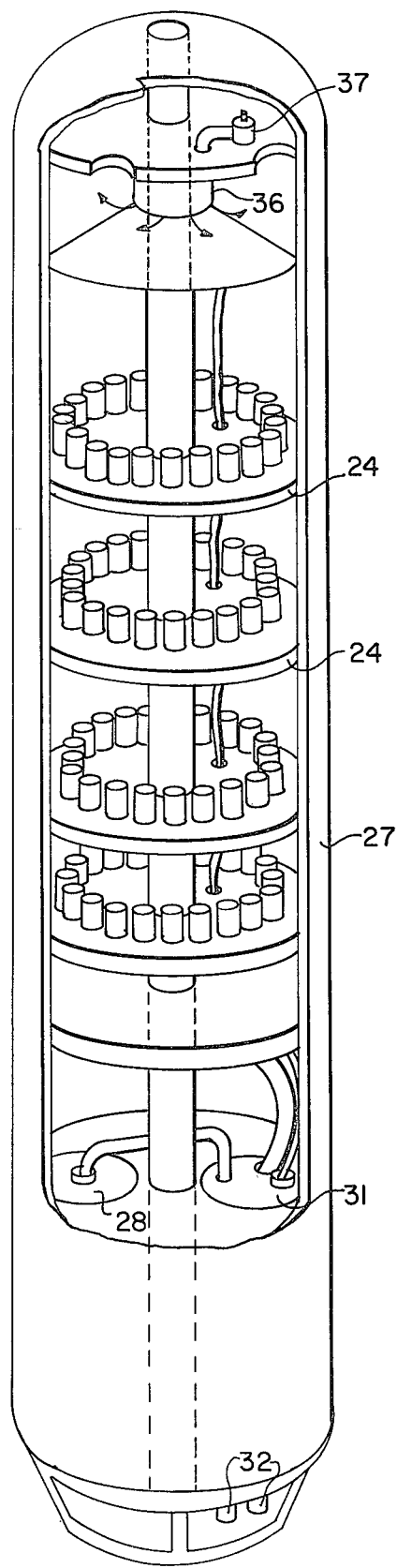
FIG. 2 illustrates a gas generator detector device by which different sea parameters may be measured.

Now referring to the drawing there is shown by illustration a hydrogen generator made in accordance with the teaching of the invention. As shown, the hydrogen generator includes a solid slug of lithium hydride 20 and binder formed under 12 tons of pressure. The solid slug of LiH is slid into a rubber boot 21 or housing of extensible material having an inside diameter equal to the outside diameter of the slug. The boot is closed at the bottom and top by use of plastic or plexiglass end caps 22 which are of a greater outer diameter than the inner diameter of the boot. The inside surface of the boot is smooth so that good contact is made with the plexiglass end caps making a water tight seal which increases with pressure. The bottom end cap is provided with a threaded hole therein on the axis thereof by which the hydrogen generator may be held in place on a partition 24 or shelf within the sensor assembly. The upper end cap is provided with a 45° angle hole 25 directed toward the axis of the device from the upper surface with the hole extending to within ¼ inch of the bottom surface of the upper end cap. A standard blasting cap 26 is secured within the hole for rupturing the end cap on command.

As an example, the rubber boot may be 2 inch inside diameter, ⅛ inch thick and 5¾ inches in length. The LiH solid slug has a 2 inch outside diameter, 3¾ in length placed within the boot with equal lengths of the boot extending beyond each end of the slug. The plexiglass end caps are 2¼ inches in outside diameter with 1 inch thickness and inserted into the ends of the boot, as shown. The inner surface of the end caps press against the ends of the slug.

Since the LiH slug is formed under 12 tons of pressure the hydrogen gas generator may be placed at great depths without further compression of the LiH slug. Further, the pressure of the water at the depths will be inwardly against the boot, thereby producing greater pressure on the boot against the slug and end caps. Which pressure will aid in holding the end caps within the boot. Since the LiH is water active, the slug must be placed in the boot in a dry surrounding.

It has been determined that the above described LiH slug will displace 3 liters of water from the assembly, producing 7 pounds of lift at a depth of 3000 ft.

In use of the hydrogen gas generator for determining profiles of the sea from just below the surface to a depth of 3000 feet, a plurality of the above described hydrogen generators are assembled in different trays 24, within a housing 27, within which are contained the power supply 28, control timer mechanism and recorder equipment 31, sensors 32, etc., which forms no part of this invention. The assembly is secured onto a line or cable 33 for movement along the cable.

The assembly is made to have a negative buoyancy so that the assembly will descend along the cable held between a buoy 34 and an anchor 35. The anchor may be placed in any desired depth of water and the buoy may be 200 feet below the surface, on the surface or at any desired depth. The sensor assembly will move up and down along a 3000 feet cable or any other desired length between the buoy and anchor depending upon a desired program. A hydrogen gas generator is activated to force the assembly upwardly and then the negative buoyance will force the device downwardly once the LiH is expended in a particular generator and vented from the assembly on command.

In operation, the buoy, anchor, gas generator sensor assembly is deployed with all desired sensors, recorders, etc., ready to be activated for use. The gas generator-sensor assembly will sink due to its negative buoyance and will be guided by the cable to the desired depth depending upon the length of the cable above the anchor. On command, by a timer control, the standard blasting cap in the end cap of one hydrogen gas generator will be activated causing the end cap to shatter. Once the end cap has shattered, water within the assembly housing enters the end of the boot to mix with and chemically activate the LiH to produce hydrogen. The reaction of the water with the LiH is as follows:

$$LiH + H_2O \rightarrow LiOH + H_2.$$

A 5 or 6 fold of excess water is required to force the reaction to completion. The hydrogen gas generated rises to a gas accumulator 36 displacing the water in the accumulator thereby producing a positive buoyancy causing the sensor assembly to rise along the cable. The housing is provided with vents through which water may enter the housing on descent and from which water is forced by the hydrogen gas during ascent. Once the assembly has reached the upper limits of the cable and all hydrogen has been expended from the activated hydrogen gas generator element, a vent valve 37 is programmed to open to permit the hydrogen gas to escape from the accumulator. Water will enter through vents into the accumulator and assembly housing. The assembly will have a negative buoyance and will sink to the bottom of the cable length above the anchor. The assembly is then ready for a programmed time activation of another hydrogen generator to repeat the process previously described.

The sensor assembly will record desired information during descent, during ascent, while at the bottom depth, and at the top depth, depending upon the type of sensor equipment carried by the sensor assembly and depending upon the programmed operation. Thus, a profile of the information along the length of the cable may be obtained as well as at the upper and lower limits of the cable.

A more efficient reaction may be obtained in a hydrogen generator by the addition of aluminum mixed in the LiH. Such a mixture has been set forth in U.S. Pat. No. 3,674,702 and has the following reaction:

$$2LiH + 2Al + 4H_2O \rightarrow 2LiAlO_2 + 5H_2$$

lithium and aluminum in powdered form are pressed together with or without binders into slugs of the size as described above for LiH.

It is understood that one skilled in the art could use large slugs of LiH if desired or one can use the same size with the firing of more than one generator if greater buoyance is required to raise the sensor payload. Further, larger slugs should be used at greater depths to obtain sufficient lift.

Once the LiH is activated by exposure to water, hydrogen generation is initiated and continues to completion in approximately 30 minutes. The generated hydrogen gas accumulates in a reservoir replacing the water which entered the assembly on descent. Any gas in excess of the accumulation will also be vented from the assembly. A hydrogen gas vent valve is provided and programmed to open for venting the hydrogen to the water. As the hydrogen is vented, water begins to enter the accumulator and assembly. Once the negative buoyance takes over, the assembly will descend to the bottom depth of the length of cable.

The assembly, using a plurality of the gas generators, programmed to fire at desired times, permits one to locate the cable-sensor system at any desired place to be left unattended for a desired period and collected later. The device will collect data as programmed during descent, during ascent, while at the bottom, and while at the top. Thus, one can collect data at all depths along a vertical line to determine the differences in current flow, salinity, temperature or any other data for which instrumentation has been provided.

It is obvious that batteries, sensors, instrumentation, electrical equipment, etc., provide weight which would cause the system to sink at a fast rate therefore the weight is naturally overcome by use of flotation material which will compensate for the weight of the various elements. It is necessary that the system have a slight negative buoyance so that the system will descend as desired and be lifted by the hydrogen gas generators as programmed.

The line 38 between the end of the cable 33 upon which the sensor assembly is guided and the anchor 35 is provided with an acoustical switch 39 which will release the cable from the anchor upon command. Therefore the sensor-assembly may be collected when desired by activation of the acoustical switch.

Obviously many modification and variations of the present invention are possible in light of the above teachings. It is therefore to be understood that within the scope of the appended claims the invention may be practiced otherwise than as specifically described.

What is claimed and desired to be secured by letters patent of the United States is:

1. In a gas generator which comprises a slug of material which reacts with water to produce a gas, the improvement which includes,
    an elongated open ended housing of extensible material,
    said housing having an inside diameter substantially equal to the outside diameter of said slug of material,
    a plastic end cap enclosing each end of said housing thereby confining said slug within said housing,
    said plastic end caps having an outer diameter greater than the inner diameter of said housing of extensible material, said end caps extending said housing about the outer surface thereof,
    an aperture extending from the outer surface of and into one end cap, the axis of the aperture being at an angle relative to and directed toward the long axis of said housing;
    a blasting cap secured within said aperture,
    whereby activation of said blasting cap ruptures said end cap permitting water to enter said housing thereby activating said slug of material to produce gas from the reaction.

2. The gas generator as claimed in claim 1 in which said aperture in which said blasting cap is placed is at a 45° angle relative to the long axis.

3. The gas generator as claimed in claim 1 in which the end cap not apertured for the blasting cap includes an axially aligned threaded hole for securing said generator to a holder.

4. The gas generator as claimed in claim 1 in which said slug of material is pressed LiH with a suitable binder for generating a hydrogen gas.

5. The gas generator as claimed in claim 1 in which said slug of material is mixed lithium and aluminum in powder form pressed into a slug for generating hydrogen.

* * * * *